(12) United States Patent
Watanabe (10) Patent No.: US 8,844,937 B2
(45) Date of Patent: Sep. 30, 2014

(54) SEALING DEVICE (75) Inventor: Koji Watanabe, Kitaibaraki (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 14/001,815

(22) PCT Filed: Mar. 6, 2012

(86) PCT No.: PCT/JP2012/055625
§ 371 (c)(1),
(2), (4) Date: Aug. 27, 2013

(87) PCT Pub. No.: WO2012/124534
PCT Pub. Date: Sep. 20, 2012

(65) Prior Publication Data
US 2013/0334775 A1    Dec. 19, 2013

(30) Foreign Application Priority Data
Mar. 11, 2011  (JP) ................. 2011-054854

(51) Int. Cl.
*F16J 9/00* (2006.01)
*F16J 9/20* (2006.01)
*F16J 15/56* (2006.01)
*F16J 15/46* (2006.01)
*F16J 9/08* (2006.01)
*F16J 15/32* (2006.01)

(52) U.S. Cl.
CPC ............... *F16J 15/322* (2013.01); *F16J 15/56* (2013.01); *F16J 15/46* (2013.01); *F16J 9/08* (2013.01); *F16J 15/3208* (2013.01); *F16J 15/3272* (2013.01)
USPC ............ 277/467; 277/434; 277/438; 277/439

(58) Field of Classification Search
CPC ................. F16J 9/20; F16J 9/063; F16J 9/10; F16J 15/32; F16J 15/3204; F16J 15/3236; F16J 15/3284
USPC ......... 277/434, 436, 438, 439, 467, 469, 470, 277/482, 484
See application file for complete search history.

(56) References Cited

U.S. PATENT DOCUMENTS

| | | | | |
|---|---|---|---|---|
| 2,841,429 A | * | 7/1958 | McCuistion | 277/402 |
| 4,102,608 A | * | 7/1978 | Balkau et al. | 417/242 |
| 4,592,558 A | * | 6/1986 | Hopkins | 277/572 |
| 6,098,987 A | * | 8/2000 | McBride | 277/436 |
| 6,416,058 B1 | * | 7/2002 | Zygmunt | 277/436 |

FOREIGN PATENT DOCUMENTS

| | | |
|---|---|---|
| JP | 2009121536 | 6/2009 |
| JP | 2009257439 | 11/2009 |

* cited by examiner

*Primary Examiner* — Gilbert Lee
(74) *Attorney, Agent, or Firm* — K. David Crockett, Esq.; Niky Economy Syrengelas, Esq.; Crockett & Crockett, PC (57) ABSTRACT

An annular sealing device for a shaft and housing that can maintain sealing properties under fluid pressure load when creep occurs in a cut portion due to thermal expansion and the perimeter is shortened. The sealing device includes a seal ring unit configured to fit within an annular groove in the shaft, and has, on the side thereof where the outer periphery is located, a sliding surface on which the seal ring unit slides on the housing; and a lip portion on the inner periphery of the seal ring. The lip portion of tip is disposed on the side of the annular groove where a groove bottom thereof is located, in such a way that the tip thereof is deformable in a direction in which the tip increases the distance between the seal ring unit and the groove bottom of the annular groove when under pressure.

7 Claims, 6 Drawing Sheets

SEALING DEVICE

FIELD OF THE INVENTIONS

The present invention relates to sealing devices and, more particularly, relates to a sealing device having a cut portion in the form of the circumference of a circle, the sealing device in which a leak path from outer surface (hereinafter referred to as "a leak path" does not occur under pressure load even when the perimeter is shortened by creep in the cut portion.

BACKGROUND ART

Figure 7:
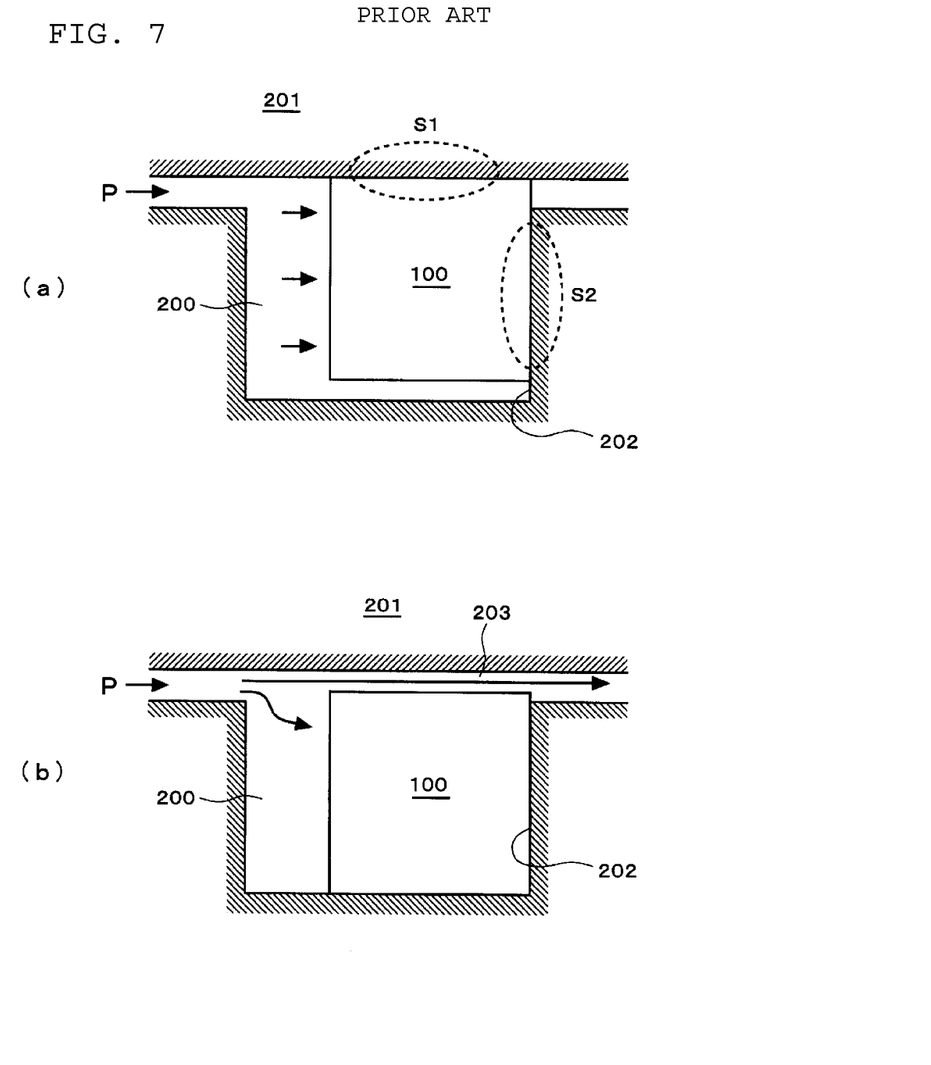
FIG. 7 is a sectional view of a sealing device formed of an existing seal ring.

As a sealing device for preventing leakage of fluid from between relative sliding parts that perform relative reciprocating motion, relative rotational motion, or relative rotational reciprocating motion like a seal or the like for rotation of an AT, a CVT, etc. for an automobile, for example, a seal ring 100 depicted in FIG. 7, the seal ring 100 formed of an annular body made of resin, has mainly been used (Patent Document 1).

Such a seal ring 100 is, as depicted in FIG. 7(a), placed in an annular groove 200 formed in the outer periphery of one sliding part (a shaft) of the relative sliding parts and is used in such a way that the outer periphery thereof is brought into intimate contact with the other sliding part (a housing) 201. When fluid pressure P is exerted, the seal ring 100 is pressed against a side wall surface 202 on the lower-pressure side (the right side in the drawing) in the annular groove 200, is brought into intimate contact with two faces: a contact portion S1 that is a sliding surface between the seal ring 100 and the other sliding part 201 and a contact portion S2 at which contact with the side wall surface 202 of the annular groove 200 is made, and fulfills a sealing function.

Figure 8:
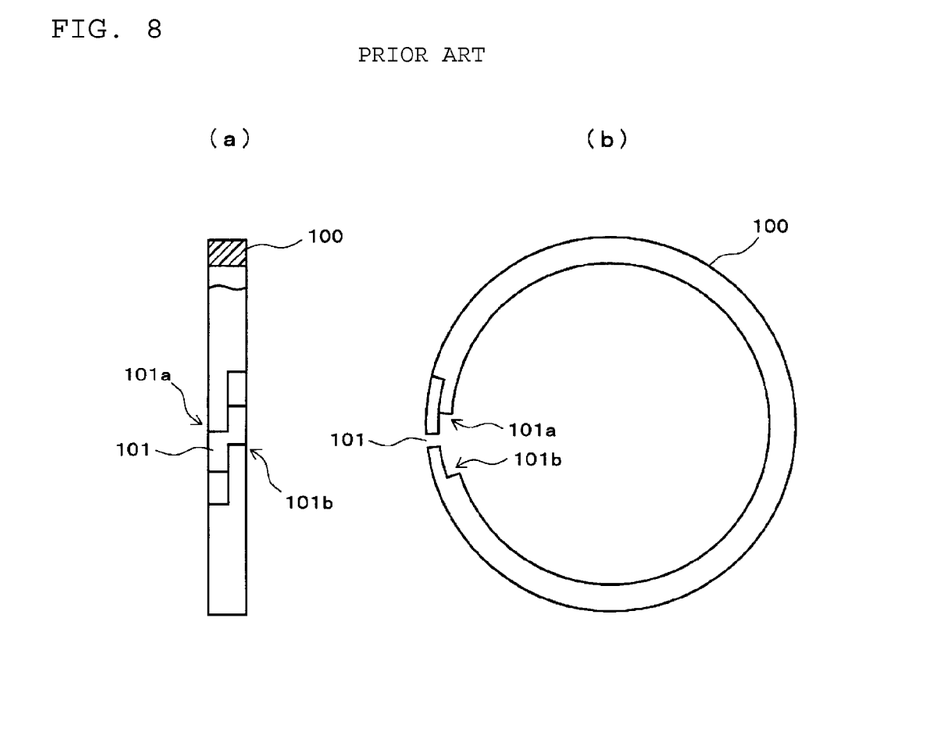

Such a seal ring 100 is made of a resin material and, in consideration of the workability of placement into the annular groove 200, as depicted in FIG. 8, has a cut portion 101 with a structure in which a ring shape is completely cut in one place on the circumference of a circle of the seal ring 100.

When such an existing seal ring 100 is used for a long period of time in a high-temperature environment, a phenomenon occurs in which the seal ring 100 thermally expands in the annular groove 200 in the direction of the perimeter and end faces 101a and 101b of the cut portion 101 strike each other and cause creep, whereby the perimeter of the seal ring 100 is shortened when the temperature becomes a low temperature again.

When the perimeter of the seal ring 100 is shortened, as a result of the seal ring 100 being reduced in diameter, as depicted in FIG. 7(b), a gap 203 is formed between the seal ring 100 and the other sliding part 201 and, under load of fluid pressure P in a low temperature environment, a leak path occurs in which the fluid passes through the gap 203.

Figure 9:
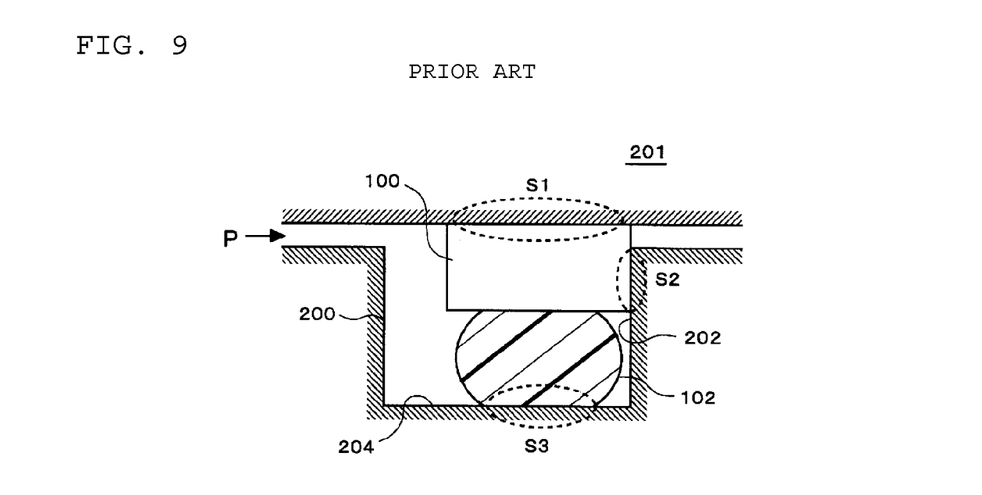
FIG. 9 is a sectional view of a sealing device formed of an existing combined seal.

To address such a problem, as depicted in FIG. 9, a sealing device that uses a combined seal obtained by combining the seal ring 100 with a rubber-like elastic body 102, places the rubber-like elastic body 102 on the side where a groove bottom 204 of the annular groove 200 is located, and is placed in such a way that the rubber-like elastic body 102 forms a predetermined squeeze margin may be used (Patent Document 2).

According to such a sealing device, since intimate contact is always made in three faces: the contact portion S1 between the seal ring 100 and the other sliding part 201, the contact portion S2 between the seal ring 100 and the side wall surface 202 of the annular groove 200, and a contact portion S3 between the rubber-like elastic body 102 and the groove bottom 204 of the annular groove 200, even when the perimeter of the seal ring 100 is shortened by creep, the elastic force of the rubber-like elastic body 102 always brings the seal ring 100 into intimate contact with the side where the other sliding part 201 is located. This prevents the formation of a gap that creates a leak path of fluid.

PRIOR ART DOCUMENTS

Patent Documents

Patent Document 1: JP-A-2009-257439
Patent Document 2: JP-A-2009-121536

SUMMARY

Disclosure of Invention

Problem to be Solved by the Invention

However, in the sealing device formed of such a combined seal, since intimate contact with the other sliding part is always made in the contact portions S1, S2, and S3 in three faces, sliding resistance at the time of operation is increased. When the sealing device is applied to, in particular, a drive system of automobile parts, such an increase in sliding resistance becomes a major problem of a decrease in fuel-efficiency performance. In addition, there is a need to place an additional rubber-like elastic body, and placement is also complicated.

Therefore, an objective of the present invention is to provide a sealing device that can maintain sealing properties under fluid pressure load with a simple structure even when creep occurs in a cut portion due to thermal expansion and the perimeter is shortened.

The other objectives of the present invention will be made clear by the following description.

Means for Solving Problem

The above problems are solved by the following invention.
1. A sealing device that is formed of an annular body made of resin, the annular body placed in an annular groove formed in an outer periphery of a shaft to seal an annular gap to keep fluid from entering the annular gap, the annular gap between a housing having a shaft hole and the shaft that is inserted into the shaft hole and performs relative sliding movement with the housing, and has a cut portion on the circumference of a circle of the annular body, the sealing device comprising:
   a seal ring unit having, on a side thereof where an outer periphery is located, a sliding surface on which the seal ring unit slides on the housing; and
   a lip portion that is provided on a side of the seal ring unit where an inner periphery thereof is located, the lip portion whose tip is placed on a side of the annular groove where a groove bottom thereof is located,
   wherein
   the lip portion is provided in such a way that the tip thereof is deformable in a direction in which the tip increases the distance between the seal ring unit and the groove bottom of the annular groove by making contact with the groove bottom of the annular groove, under load of fluid pressure, by the fluid pressure.
2. The sealing device according to 1, comprising:
   a groove portion between the seal ring unit and the lip portion, wherein
the groove portion is formed to open only to an inflow side of the fluid pressure.
3. The sealing device according to 1, comprising:
a groove portion between the seal ring unit and the lip portion,
wherein
the groove portion is formed to open to both an inflow side and an outflow side of the fluid pressure.
4. The sealing device according to 1, 2, or 3, wherein
the lip portion is molded integrally with the seal ring unit.
5. The sealing device according to 1, 2, or 3, wherein
the lip portion is formed separately from the seal ring unit and is bonded to the side of the seal ring unit where the inner periphery thereof is located.
6. The sealing device according to any one of 1 to 5, wherein
the lip portion is provided on the whole circumference of the seal ring unit.
7. The sealing device according to any one of 1 to 5, wherein
the lip portion is provided in parts of the seal ring unit in a circumferential direction thereof.

Effect of the Invention

According to the present invention, it is possible to provide a sealing device that can maintain sealing properties under fluid pressure load with a simple structure even when creep occurs in a cut portion due to thermal expansion and the perimeter is shortened.

BRIEF DESCRIPTION OF THE DRAWINGS

FIG. 8(*a*) is a side view of a sealing device formed of an existing seal ring, the sealing device whose part is cut out, and FIG. 8(*b*) is a front view thereof.

DETAILED DESCRIPTION OF THE INVENTIONS

A sealing device according to the present invention is formed of an annular body made of resin, the annular body placed in an annular groove formed in the outer periphery of a shaft to seal an annular gap to keep fluid from entering the annular gap, the annular gap between a housing having a shaft hole and the shaft that is inserted into the shaft hole and performs relative sliding movement with the housing, and has a cut portion on the circumference of a circle of the annular body.

The annular body has a seal ring unit having, on the outer periphery thereof, a sliding surface on which the seal ring unit slides on the housing and a lip portion that is provided on the side of the seal ring unit where the inner periphery thereof is located, the lip portion whose tip is placed on the side of the annular groove where a groove bottom thereof is located. This lip portion is provided in such a way that the tip thereof is deformable in a direction in which the tip increases the distance between the seal ring unit and the groove bottom of the annular groove by making contact with the groove bottom of the annular groove, under load of fluid pressure, by the fluid pressure.

That is, under load of fluid pressure, the seal ring unit is pressed and brought into intimate contact with a side wall surface on the lower-pressure side in the annular groove, and the tip of the lip portion is deformed by the load of fluid pressure in such a way as to increase the distance between the seal ring unit and the groove bottom of the annular groove by making contact with the groove bottom of the annular groove. With this deformation, the seal ring unit is increased in diameter in such a way that the outer periphery thereof is brought into intimate contact with the housing.

Therefore, even when the perimeter of the seal ring unit is shortened due to creep in the cut portion, as a result of the lip portion increasing the seal ring unit in diameter by the load of fluid pressure, the lip portion performs the function of closing a gap between the seal ring unit and the housing, the gap which causes a leak path, and maintains sealing properties.

The tip of the lip portion simply has to be deformed under load of fluid pressure and make contact with the groove bottom of the annular groove and does not have to be brought into intimate contact therewith at all times. Therefore, as compared to a sealing device formed only of an existing seal ring, there is no possibility of an increase in sliding resistance.

Moreover, since the seal ring unit and the lip portion are integrated to form the annular body, the sealing device according to the present invention has a simple structure as compared to a combined seal formed of a plurality of components, and there is no possibility that placement into the annular groove is complicated.

A groove portion formed between the seal ring unit and the lip portion may be formed to open only to the inflow side of the fluid pressure and may be formed to open to both the inflow side and the outflow side of the fluid pressure. According to the former, it is possible to form a large groove portion, making it possible to ensure a large amount of deformation of the lip portion. Moreover, according to the latter, it is possible to place the sealing device irrespective of the direction of the action of the fluid pressure and thereby improve workability.

The lip portion may be molded integrally with the seal ring unit or may be formed separately from the seal ring unit and bonded to the side of the seal ring unit where the inner periphery thereof is located. In both cases, it is possible to integrate the seal ring unit and the lip portion (into one part); according to the former, it is possible to obtain a sealing device having a lip portion with ease by integral molding. Moreover, according to the latter, it is possible to form the lip portion by using an optimum material which is different from the material of the seal ring unit.

The lip portion may be provided on the whole circumference of the seal ring unit or may be provided in parts of the seal ring unit in a circumferential direction thereof. According to the former, since it is possible to exert a diameter increasing influence on the whole circumference of the seal ring unit, the diameter increasing influence by the deformation of the lip portion, the response of the deformation of the lip portion is quick under fluid pressure load, making it possible to achieve reliable sealing soon after the fluid pressure load. Moreover, according to the latter, since it is possible to make the zone of contact between the lip portion and the groove bottom of the annular groove smaller, it is possible to suppress an increase in sliding resistance at the time of operation.

In the present invention, the shape of the cut portion is not limited to a particular shape. For example, when the cut portion has a shape, like step cut, in which the cut portion has cut end faces facing each other in the circumferential direction of the seal ring unit, since the cut end faces strike each other due to thermal expansion in the direction of the perimeter of the seal ring unit and creep tends to occur, a pronounced effect can be obtained by adopting the sealing device according to the present invention.

Next, specific embodiments of the present invention will be described by using the drawings.

Figure 1:
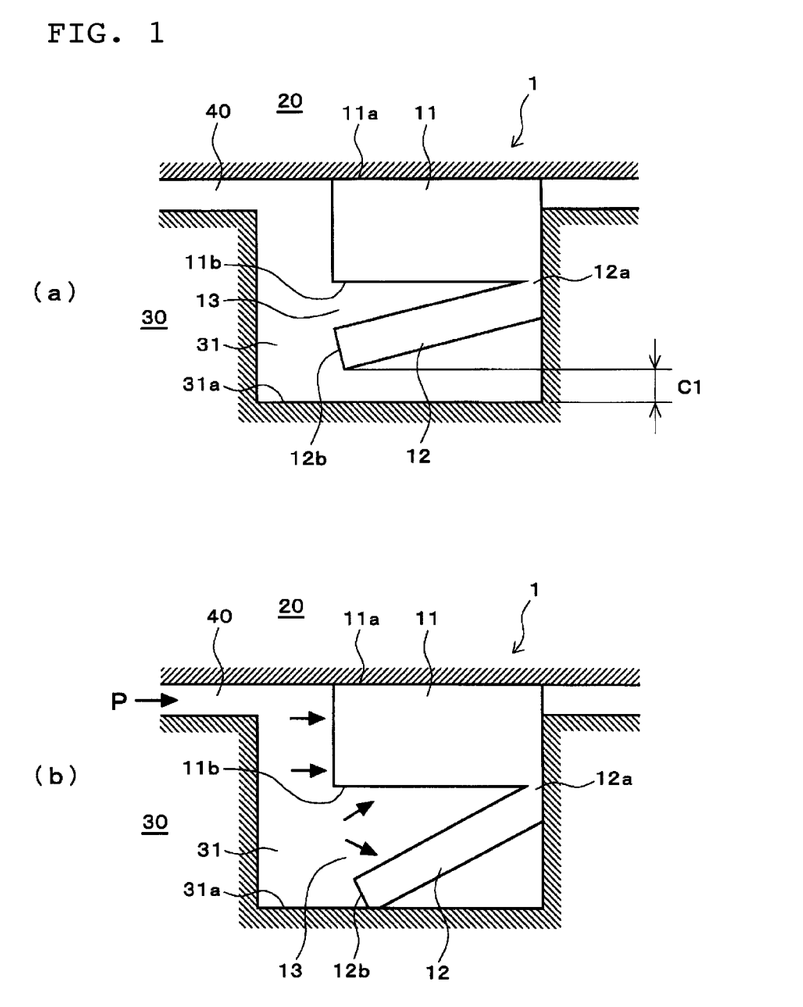
FIG. 1 is a sectional view of an example of a sealing device according to the present invention, the sealing device before the occurrence of creep.
Figure 2:
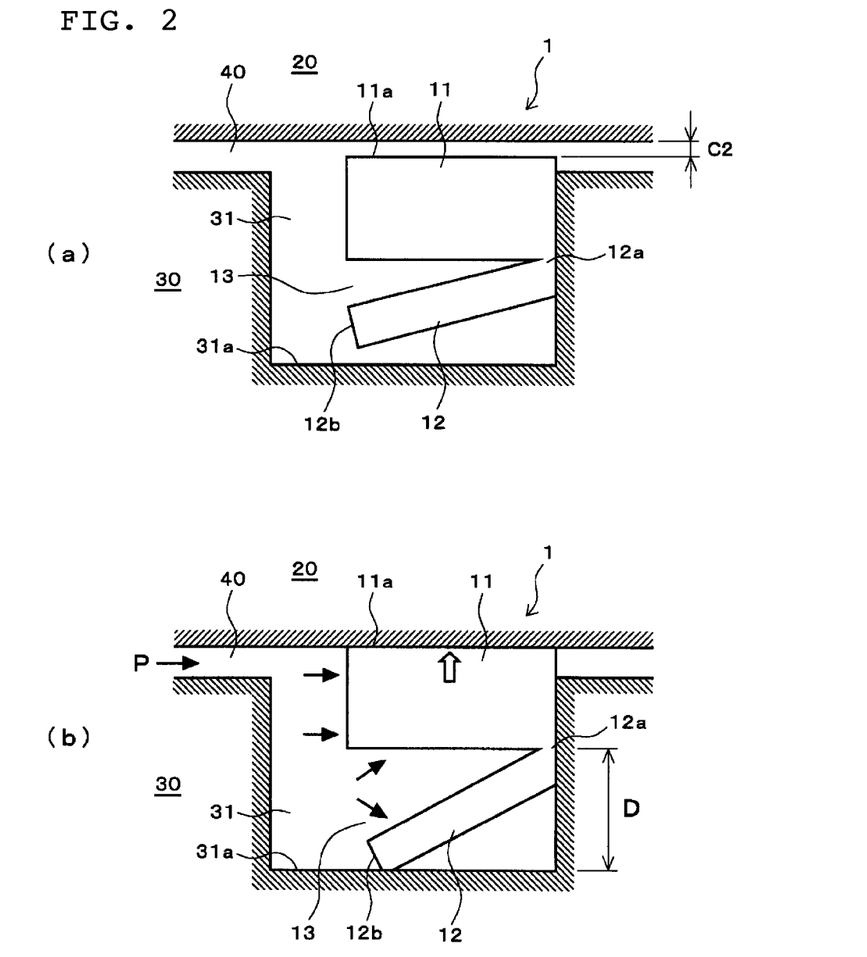
FIG. 2 is a sectional view of the example of the sealing device according to the present invention, the sealing device after the occurrence of creep.

FIGS. 1 and 2 are sectional views of an example of the sealing device according to the present invention. In the drawing, 1 denotes a sealing device, which is placed in an annular groove 31 formed in one sliding part 30 to seal an annular gap 40 that is formed between sliding parts 20 and 30 that slide on each other by performing relative reciprocating motion, relative rotational motion, or relative rotational reciprocating motion. Here, the sliding part 20 is a housing having a shaft hole and the sliding part 30 is a shaft, and, as a result of the sliding part 30 being inserted into the shaft hole of the sliding part 20, the annular gap 40 is formed between the sliding parts 20 and 30. The annular groove 31 is provided as a concave portion in the outer periphery of the sliding part 30.

Incidentally, in all the modes of the sealing device explained in this description, the fluid pressure is assumed to act in a direction from left to right in the drawing.

In the sealing device 1, 11 denotes a seal ring unit, and 12 denotes a lip portion. In the seal ring unit 11, a face on the side opposite to the lip portion 12 is an outer periphery 11a and is a sliding surface between the seal ring unit 11 and the sliding part 20.

The seal ring unit 11 can be formed of a resin that can be used as a seal ring for sealing the fluid pressure, and can be formed of, for example, resins such as polytetrafluoroethylene, a tetrafluoroethylene-perfluoroalkyl vinyl ether copolymer, a tetrafluoroethylene-hexafluoropropylene copolymer, and polyamide (nylon).

In the seal ring unit 11, a cut portion (not shown) formed by step cut, for example, the cut portion with a structure in which the shape of a ring is completely cut in one place on the circumference of a circle of the seal ring unit 11, is formed in the same manner as in FIG. 8.

The lip portion 12 is integrally formed, by using the same resin as that forming the seal ring unit 11, on the whole circumference of the seal ring unit 11 on the side where an inner periphery 11b thereof is located, and extends obliquely from the right side (the outflow side of the fluid pressure) in the drawing in an axial direction of the seal ring unit 11 to a groove bottom 31a of the annular groove 31. As a result, between the seal ring unit 11 and the lip portion 12, a laterally-facing V-shaped groove portion 13 that opens only in one direction of the axial direction of the seal ring unit 11 is formed. The sealing device 1 is placed in the annular groove 31 after being positioned in such a way that the groove portion 13 opens to the inflow side (the left side in the drawing) of the fluid pressure.

A side of the lip portion 12 where a tip 12b is located can be bent and deformed at a joint 12a between the lip portion 12 and the seal ring unit 11 toward the side where the groove bottom 31a is located.

FIG. 1 depicts a state in which creep in the cut end faces of the cut portion, the creep caused by thermal expansion in the direction of the perimeter, has not yet occurred in the seal ring unit 11. The sealing device 1 is placed in the annular groove 31 with predetermined interference such that the outer periphery 11a of the seal ring unit 11 is brought into intimate contact with the sliding part 20, and the inclination of the lip portion 12 is set in such a way that, under no load of fluid pressure P depicted in FIG. 1(a), a predetermined clearance C1 that does not allow the tip 12b of the lip portion 12 to make contact with the groove bottom 31a of the annular groove 31 is formed. Therefore, the sealing device 1 is placed in the annular groove 31 only by the interference of the seal ring unit 11.

When load of the fluid pressure P is applied from this state, as depicted in FIG. 1(b), the fluid pressure P that has flowed into the annular groove 31 through the annular gap 40 also acts on the inside of the groove portion 13 between the seal ring unit 11 and the lip portion 12. As a result, the lip portion 12 is bent and deformed in such a way that the tip 12b makes contact with the groove bottom 31a by using the joint 12a as a point of support. With this bending and deformation, the clearance C1 between the tip 12b of the lip portion 12 and the groove bottom 31a disappears.

After the tip 12b makes contact with the groove bottom 31a by the bending and deformation under load of the fluid pressure P, since the lip portion 12 increases the seal ring unit 11 in diameter and exerts a force in a direction in which the outer periphery 11a of the seal ring unit 11 is pressed against the sliding part 20, the lip portion 12 can seal the annular gap 40 reliably.

FIG. 2 depicts a state in which, in the sealing device 1 of FIG. 1, creep has occurred in the seal ring unit 11 in the cut end faces of the cut portion by thermal expansion in the direction of the perimeter due to long-term use in a high-temperature environment.

As a result of the perimeter being shortened by the occurrence of creep, the seal ring unit 11 decreases in diameter when the temperature becomes a low temperature again, and, under no load of fluid pressure P depicted in FIG. 2(a), a clearance C2 is formed between the sliding part 20 and the outer periphery 11a of the seal ring unit 11. In the past, this clearance C2 has resulted in the generation of a leak path under load of the fluid pressure P in a low-temperature environment.

However, in the sealing device 1, when load of the fluid pressure P is applied from this state, as depicted in FIG. 2(b), the fluid pressure P that has flowed into the annular groove 31 through the annular gap 40 also acts on the inside of the groove portion 13 between the seal ring unit 11 and the lip portion 12. As a result, the lip portion 12 is bent and deformed in such a way that the tip 12b makes contact with the groove bottom 31a by using the joint 12a as a point of support.

At this time, since the clearance C2 is formed on the side of the seal ring unit 11 where the outer periphery 11a is located, the lip portion 12 increases the distance D between the seal ring unit 11 and the groove bottom 31a of the annular groove 31 by being bent and deformed in such a way as to increase the groove portion 13 by the fluid pressure P. As a result of this bending and deformation of the lip portion 12, the seal ring unit 11 is increased in diameter, and the outer periphery 11a thereof is brought into intimate contact with the sliding part 20. As a result, the clearance C2 disappears, and the space between the sliding parts 20 and 30 is sealed in such a way that no leakage channel is formed in the annular gap 40, whereby sealing properties are maintained.

Figure 3:
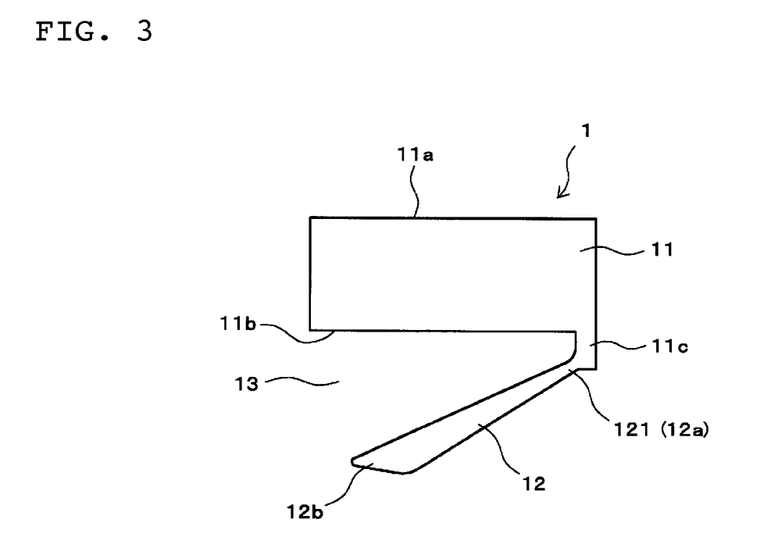
FIG. 3 is a sectional view of another example of the sealing device according to the present invention.
Figure 4:
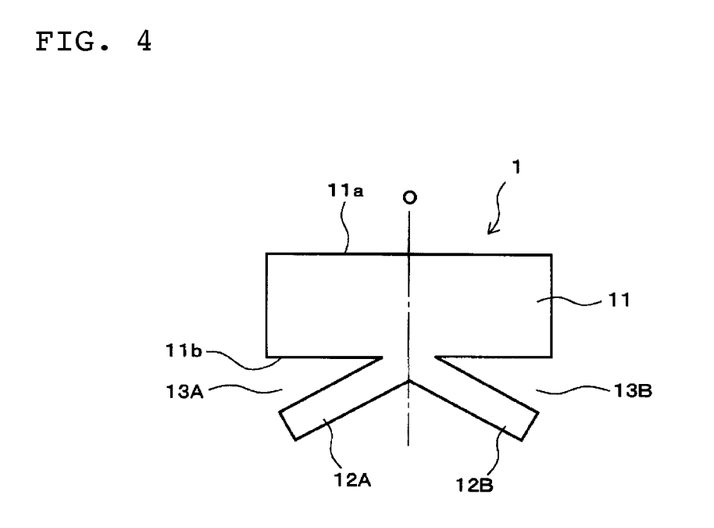
FIG. 4 is a sectional view of still another example of the sealing device according to the present invention.
Figure 5:
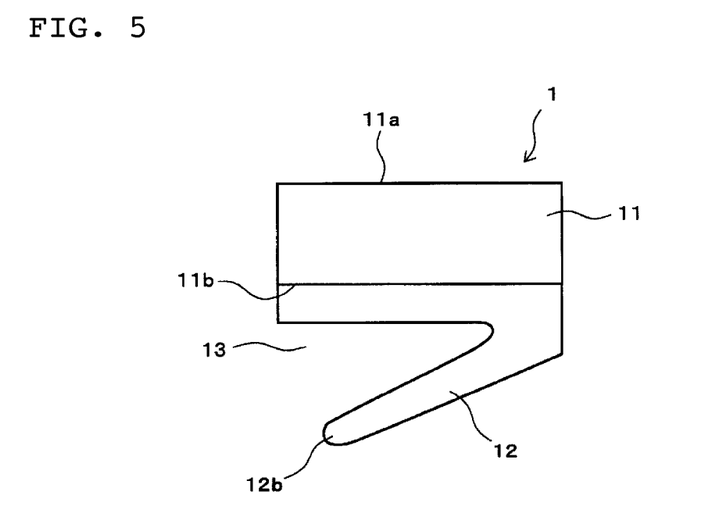
FIG. 5 is a sectional view of still another example of the sealing device according to the present invention.

In the present invention, the shape of the lip portion 12 is not limited to the shape depicted in FIGS. 1 and 2 and simply has to perform the function of increasing the seal ring unit 11 in diameter by being bent and deformed toward the groove bottom 31a of the annular groove 31 under load of the fluid pressure P. For example, the lip portion 12 may have various shapes as illustrated in FIGS. 3 to 5 by examples. Incidentally, in FIGS. 3 to 5, although the sliding parts 20 and 30 are not depicted, each sealing device 1 is shown in section in a state in which the sealing device 1 is placed in the annular groove 31 in the same manner as in FIGS. 1 and 2.

In FIG. 3, the lip portion 12 extends obliquely from a lower end of a flange portion 11c jutting from an end in the inner periphery 11b of the seal ring unit 11, the end on the right side in the drawing in the axial direction, toward the groove bottom 31a of the annular groove 31 (the direction of the center of the ring) toward the left side in the drawing in the axial direction of the seal ring unit 11 and toward the groove bottom 31a.

In the lip portion 12, a joint 12a between the lip portion 12 and the flange portion 11c is formed as a bending and deformed portion 121 which is formed to be thinner than the other portions, and, when load of the fluid pressure P is applied, a side of the lip portion 12 closer to the tip 12b than the bending and deformed portion 121 is bent and deformed toward the groove bottom 31a of the annular groove 31.

FIG. 4 is an example in which two lip portions 12A and 12B are provided on a side of the seal ring unit 11 where the inner periphery 11b is located.

One end of each of the lip portions 12A and 12B is integrally connected to the central part of the seal ring unit 11 in the axial direction thereof, and the tip sides of the lip portions 12A and 12B extend obliquely in opposing directions in the axial direction. As a result, the sealing device 1 is formed to have a symmetrical shape with respect to a center line O in the axial direction. Between the seal ring unit 11 and the lip portions 12A and 12B, two groove portions 13A and 13B are formed, and the groove portions 13A and 13B open in opposing directions. That is, the groove portions 13A and 13B open to the inflow side (the left side in the drawing) and the outflow side (the right side in the drawing), respectively, of the fluid pressure P.

When this sealing device 1 is placed in the annular groove 31 in such a way that the lip portion 12A and the groove portion 13A are located on the inflow side of the fluid pressure P, under load of the fluid pressure P, the lip portion 12A is bent and deformed and makes contact with the groove bottom 31a of the annular groove 31 and is deformed in a direction in which the lip portion 12A increases the distance between the seal ring unit 11 and the groove bottom 31a of the annular groove 31. Moreover, when this sealing device 1 is placed in the annular groove 31 in such a way that the lip portion 12B and the groove portion 13B are located on the inflow side of the fluid pressure P, under load of the fluid pressure P, the lip portion 12B is bent and deformed and makes contact with the groove bottom 31a of the annular groove 31 and is deformed in a direction in which the lip portion 12B increases the distance between the seal ring unit 11 and the groove bottom 31a of the annular groove 31. Therefore, this sealing device 1 can be placed in the annular groove 31 irrespective of the direction of the action of the fluid pressure P, and workability is improved.

The shape of such two symmetrical lip portions 12A and 12B may be the shape of the lip portion depicted in FIG. 3.

FIG. 5 is an example in which the lip portion 12 is formed separately from the seal ring unit 11 and the lip portion 12 is integrated with the seal ring unit 11 by bonding the lip portion 12 to the side of the seal ring unit 11 where the inner periphery 11b is located.

This lip portion 12 is formed of a rubber-like elastic body into a laterally-facing V-shape and is integrally bonded to the inner periphery 11b of the seal ring unit 11. As a result, the tip 12b of the lip portion 12 extends obliquely from the inner periphery 11b of the seal ring unit 11 to the groove bottom 31a of the annular groove 31 and performs the function of making contact with the groove bottom 31a under load of the fluid pressure P.

Since such a lip portion 12 can be formed by using an optimum material which is different from the material of the seal ring unit 11 and the lip portion 12 can be integrated with the seal ring unit 11 (into one part) by bonding, placement into the annular groove 31 is easy because these portions can be treated as one part.

Also in such a case where the lip portion 12 is formed separately from the seal ring unit 11, the shape of the lip portion may be the shape of the lip portion depicted in FIG. 3, and the lip portion 12 may have two lip portions 12A and 12B as depicted in FIG. 4.

In the above explanation, it is assumed that the lip portion 12 is formed on the whole circumference of the seal ring unit 11, but the lip portion 12 may be provided in parts of the seal ring unit 11 in a circumferential direction thereof.

Figure 6:
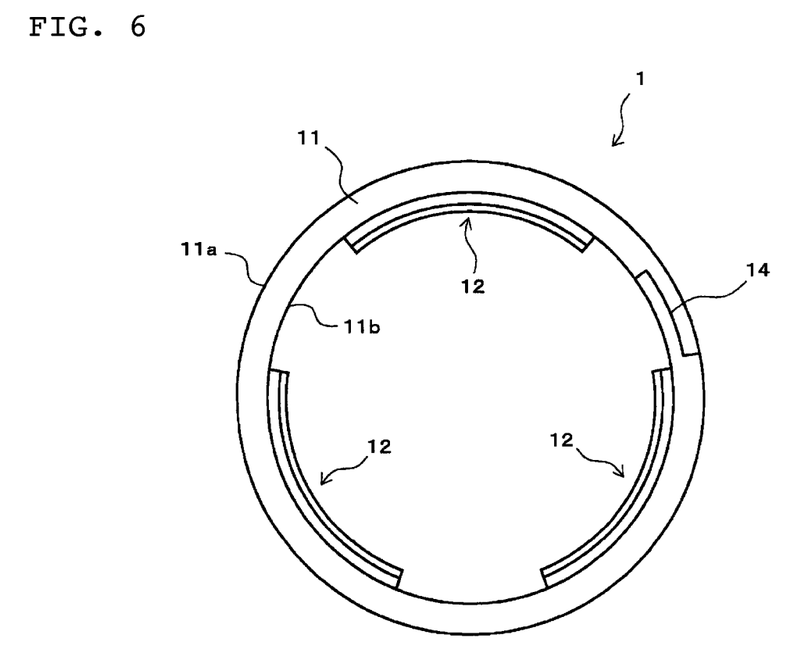
FIG. 6 is a front view of a sealing device in which a lip portion is provided in parts of a seal ring unit in a circumferential direction thereof.

FIG. 6 is front view of an example in which the lip portion 12 is provided in parts of the seal ring unit 11 in a circumferential direction thereof. In the drawing, 14 denotes a cut portion.

Here, a mode in which three lip portions 12 having the shape depicted in FIGS. 1 and 2 are placed in such a way as to be away from one another equidistantly at an angle of 120° is depicted. However, the shape, the number, and the placement of the lip portions 12 can be changed appropriately and are not limited to particular shape, number, and placement.

By providing the lip portion 12 in parts of the seal ring unit 11 in a circumferential direction thereof in the manner described above, it is possible to make the zone of contact between the lip portion 12 and the groove bottom 31a of the annular groove 31 smaller, which makes it possible to suppress an increase in sliding resistance at the time of operation.

EXPLANATIONS OF LETTERS OR NUMERALS

1: sealing device
11: seal ring unit
11a: outer periphery
11b: inner periphery
11c: flange portion
12, 12A, 12B: lip portion
12a: joint
12b: tip
121: bending and deformed portion
13, 13A, 13B: groove portion
14: cut portion
20: sliding part (housing)
30: sliding part (shaft)
31: annular groove
31a: groove bottom
40: annular gap

I claim:

1. A sealing device that is formed of an annular body made of resin, the annular body placed in an annular groove formed in an outer periphery of a shaft to seal an annular gap to keep fluid from entering the annular gap, the annular gap between a housing having a shaft hole and the shaft that is inserted into the shaft hole and performs relative sliding movement with the housing, and has a cut portion on the circumference of a circle of the annular body, the sealing device comprising:
  a seal ring unit having, on a side thereof where an outer periphery is located, a sliding surface on which the seal ring unit slides on the housing; and
  a lip portion that is provided in such a way that the tip of the lip portion is placed in a flexural and deformable manner toward the groove bottom at a joint as the center is located on an inner periphery side of the seal ring unit,
  wherein the lip portion is provided in such a way that the tip thereof does not make contact with the groove bottom of the annular groove under no load of fluid pressure and the lip portion is flexed and deformed on its tip side toward the groove bottom at a joint with the seal ring unit as the center, under load of fluid pressure, by the fluid pressure, so that the lip portion, after its tip making contact with the groove bottom of the annular groove, is deformable with the flexure and deformation in a direction in which the tip increases the distance between the seal ring unit and the groove bottom of the annular groove.

2. The sealing device according to claim 1, comprising:
  a groove portion between the seal ring unit and the lip portion,
  wherein the groove portion is formed to open only to an inflow side of the fluid pressure.

3. The sealing device according to claim 1, comprising:
  a groove portion between the seal ring unit and the lip portion,
  wherein the groove portion is formed to open to both an inflow side and an outflow side of the fluid pressure.

4. The sealing device according to claim 1, wherein the lip portion is molded integrally with the seal ring unit.

5. The sealing device according to claim 1, wherein the lip portion is formed separately from the seal ring unit and is bonded to the side of the seal ring unit where the inner periphery thereof is located.

6. The sealing device according to claim 1, wherein the lip portion is provided on the whole circumference of the seal ring unit.

7. The sealing device according to claim 1, wherein the lip portion is provided in parts of the seal ring unit in a circumferential direction thereof.

* * * * *